(12) United States Patent
Carrier

(10) Patent No.: US 7,309,086 B2
(45) Date of Patent: Dec. 18, 2007

(54) UNI-KNOT TYING APPARATUS

(76) Inventor: Calvin Carrier, 9 Costa Del Sol, Monarch Beach, CA (US) 92629

( * ) Notice: Subject to any disclaimer, the term of this patent is extended or adjusted under 35 U.S.C. 154(b) by 67 days.

(21) Appl. No.: 11/350,311

(22) Filed: Feb. 8, 2006

(65) Prior Publication Data

US 2007/0182157 A1    Aug. 9, 2007

(51) Int. Cl.
*D03J 3/00*    (2006.01)
(52) U.S. Cl. ...................................... 289/17
(58) Field of Classification Search ................. 289/17
See application file for complete search history.

(56) References Cited

U.S. PATENT DOCUMENTS

| | | | |
|---|---|---|---|
| 2,145,439 A * | 1/1939 | Torrence | 242/447.3 |
| 3,520,566 A * | 7/1970 | Bovigny | 289/17 |
| 4,573,719 A * | 3/1986 | Aldridge | 289/17 |
| 4,714,281 A * | 12/1987 | Peck | 289/1.5 |
| 6,209,930 B1 * | 4/2001 | Johnston et al. | 289/17 |

* cited by examiner

*Primary Examiner*—Shaun R. Hurley
(74) *Attorney, Agent, or Firm*—Stetina Brunda Garred & Brucker

(57) ABSTRACT

Disclosed is a uni-knot tying device. The device includes a stator, a hollow cylindrical rotor which is rotatably mounted on the stator, and a rotating drive operatively coupled to the rotor. The rotor has a proximal end and a distal end, and includes a longitudinal slot extending from the proximal end to the distal end. The device also includes a line locking member facing the proximal end of the rotor, as well as a tackle securing member and a line centering member facing the distal end of the rotor. Fishing line is threaded through the hollow cylindrical rotor and then looped around the same, forming a uni-knot.

18 Claims, 6 Drawing Sheets

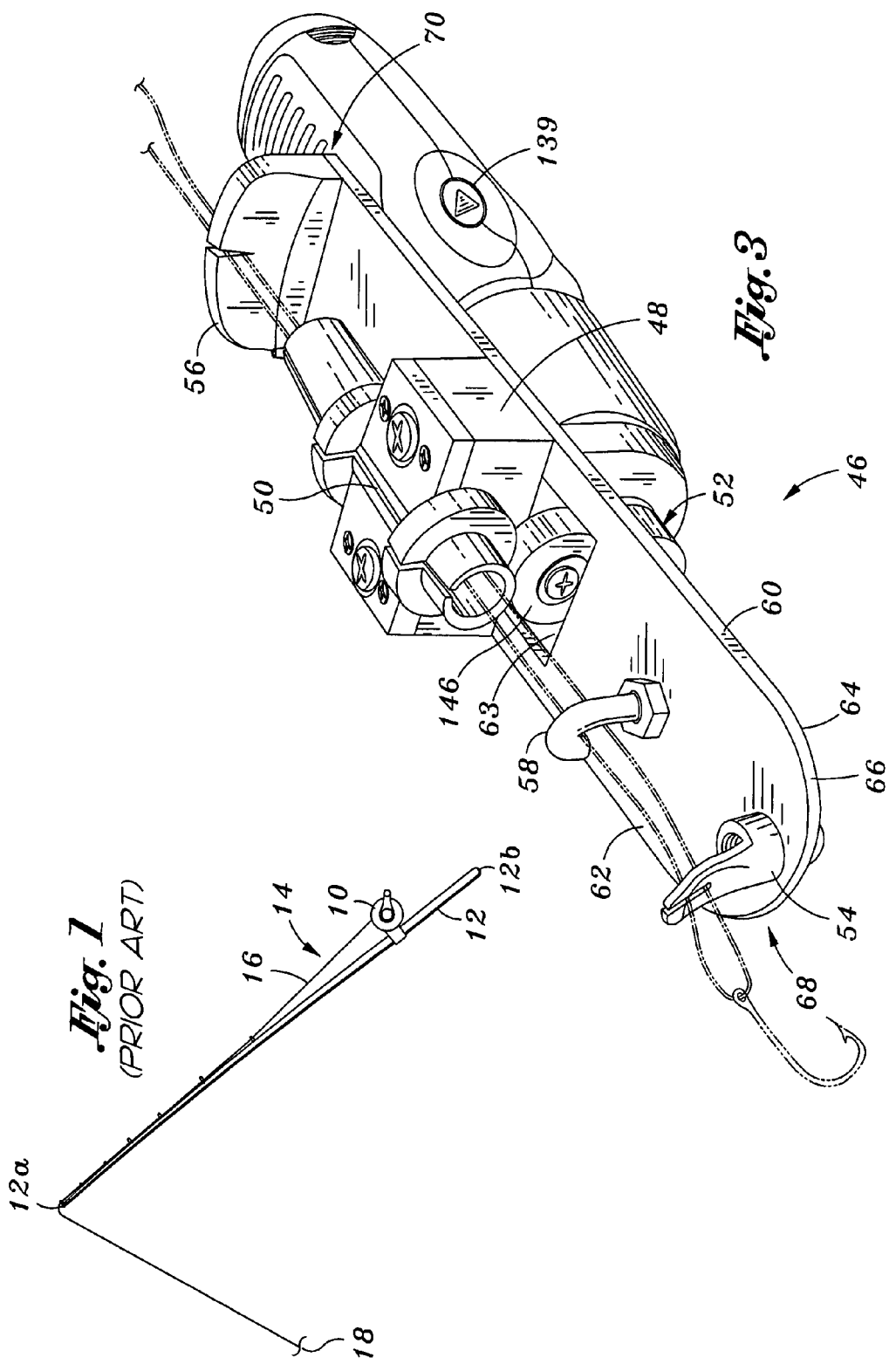

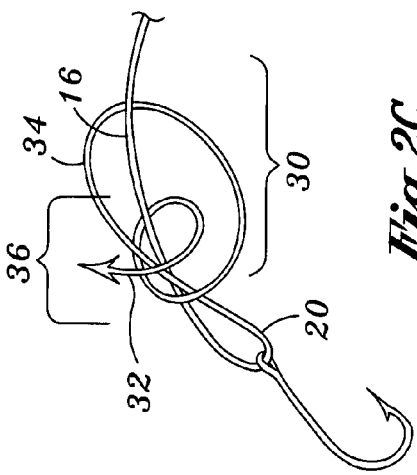
Fig.2A (PRIOR ART)
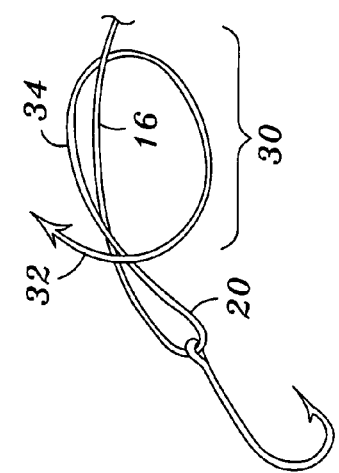
Fig.2B (PRIOR ART)
Fig.2C (PRIOR ART)
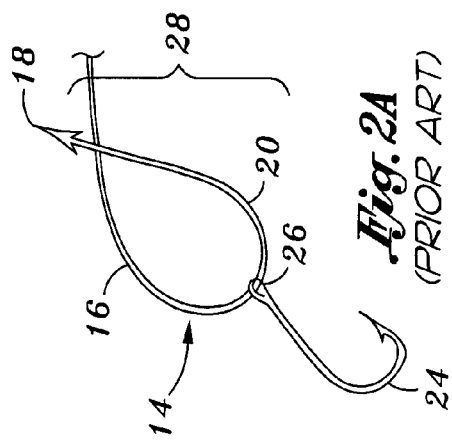
Fig.2D (PRIOR ART)
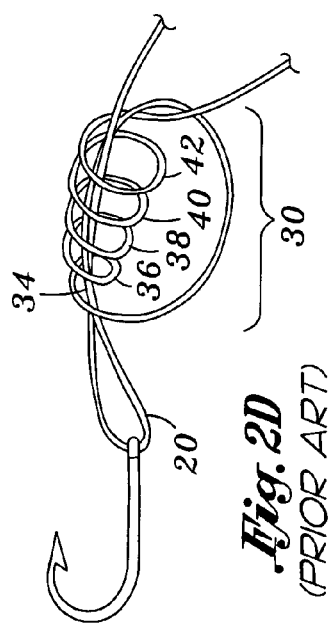
Fig.2E (PRIOR ART)
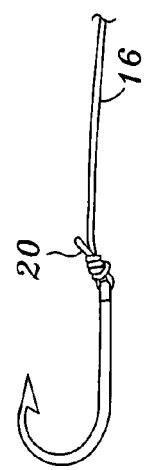
Fig.2F (PRIOR ART)

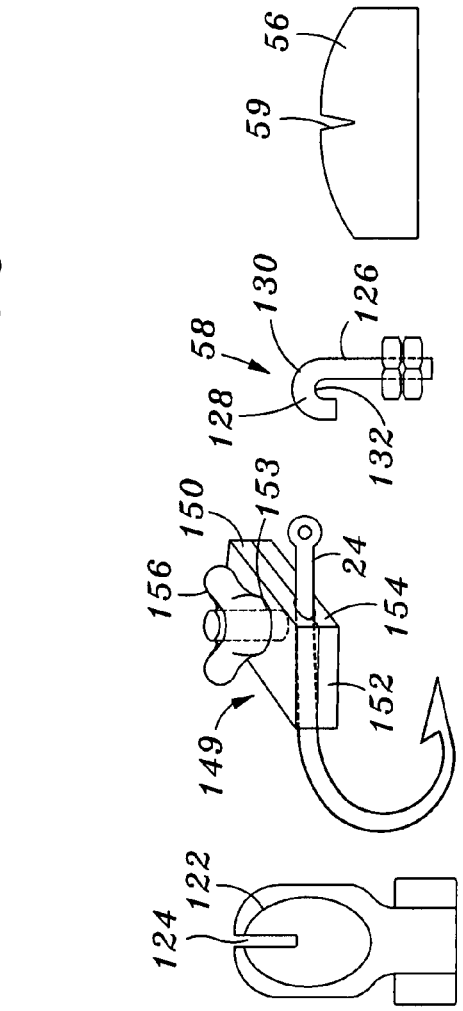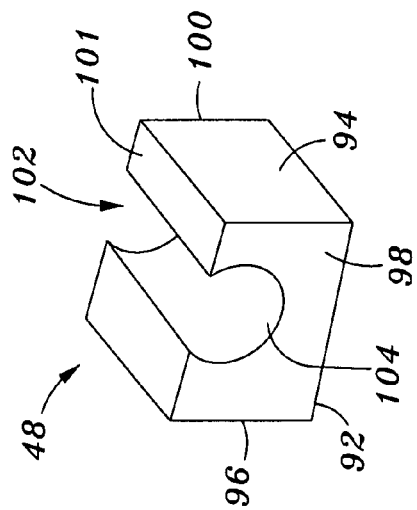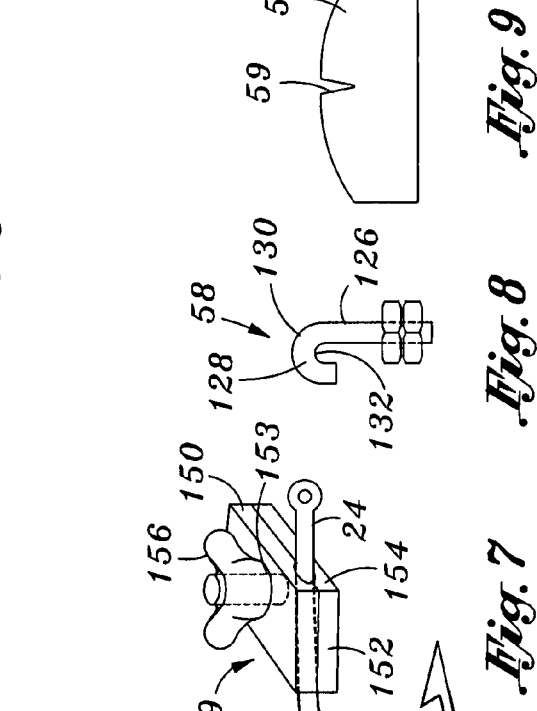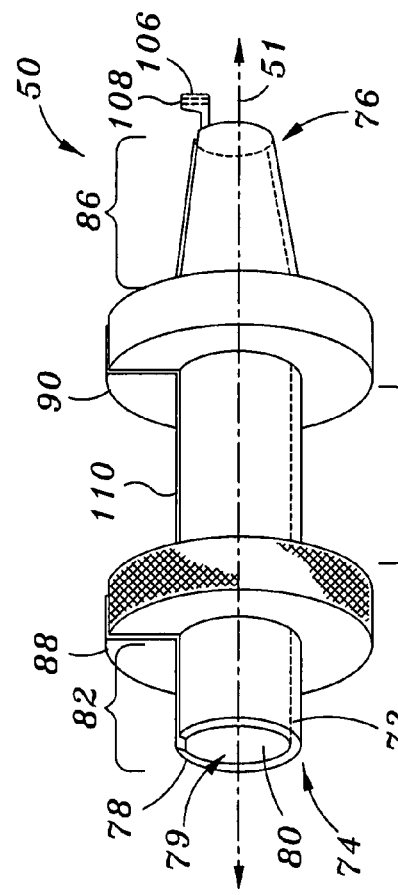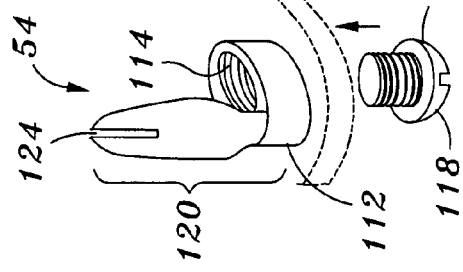

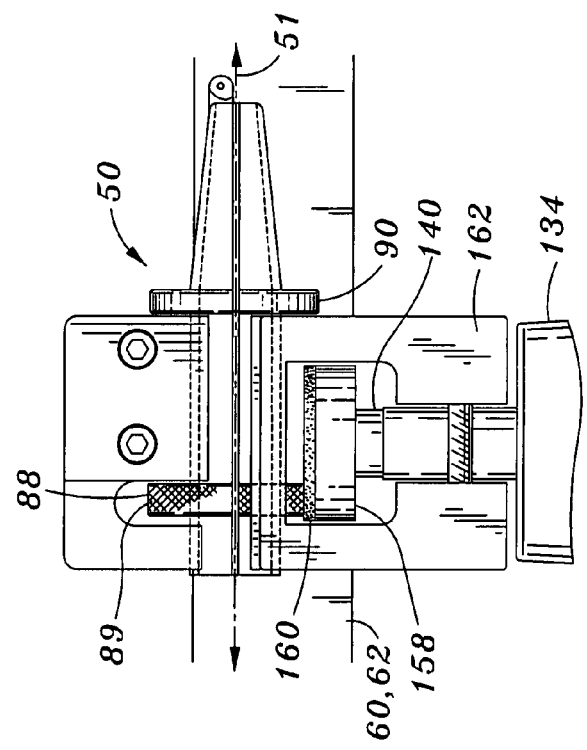
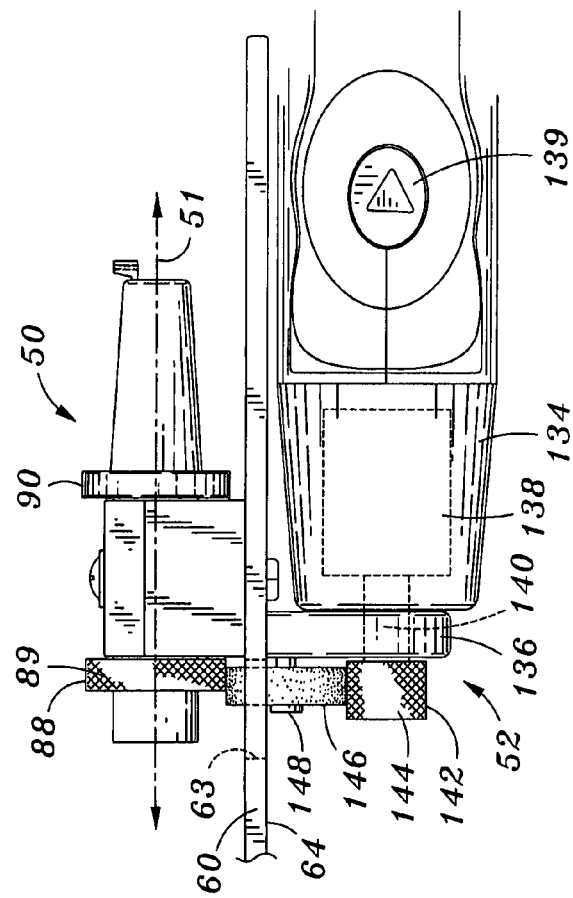
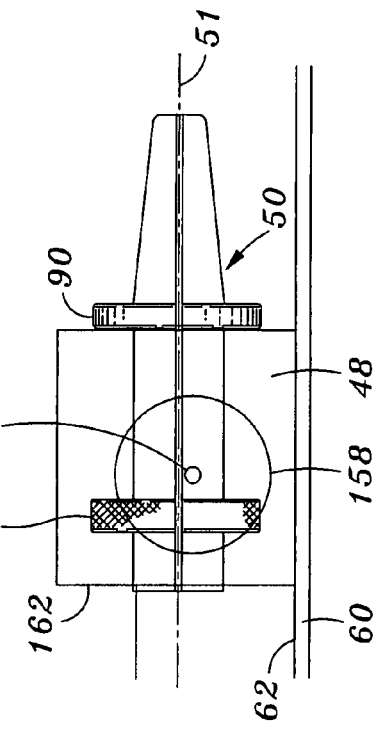
Fig. 11a
Fig. 11b
Fig. 10

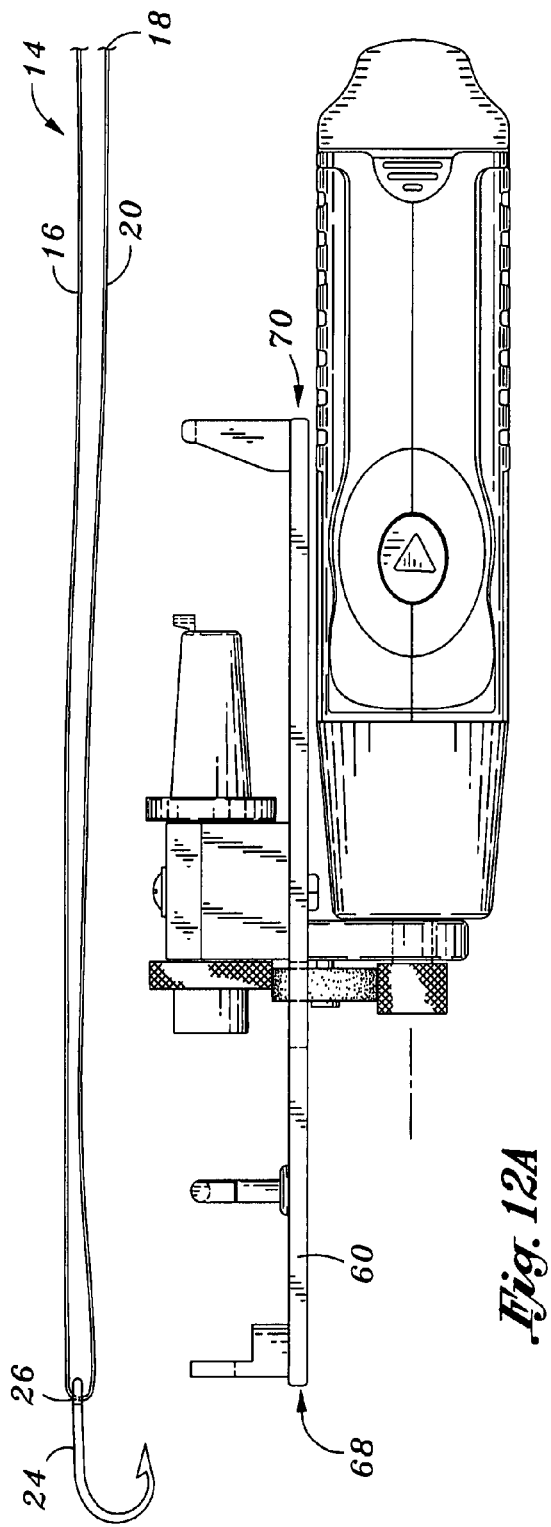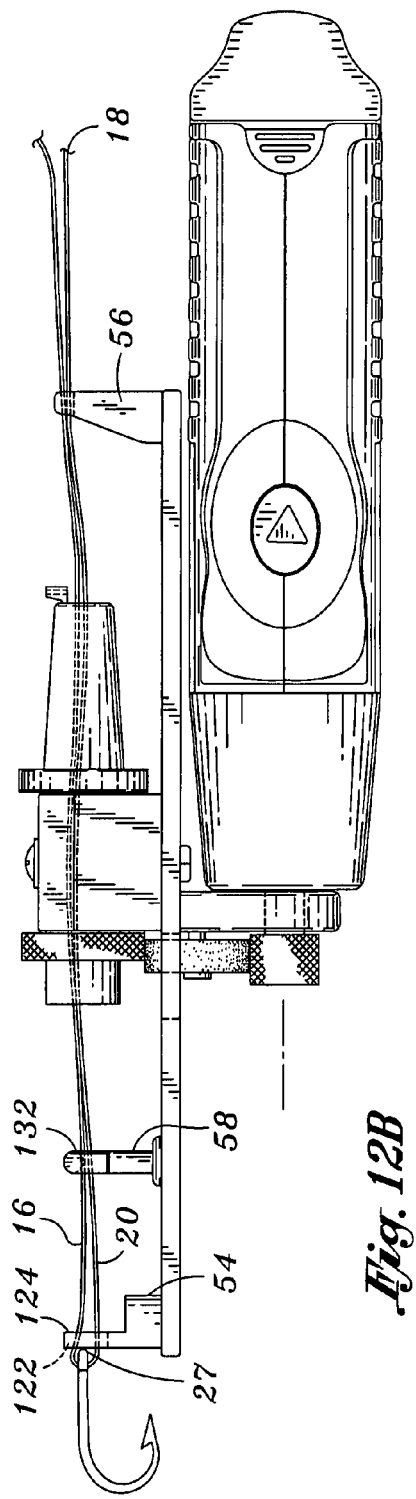
Fig. 12A
Fig. 12B

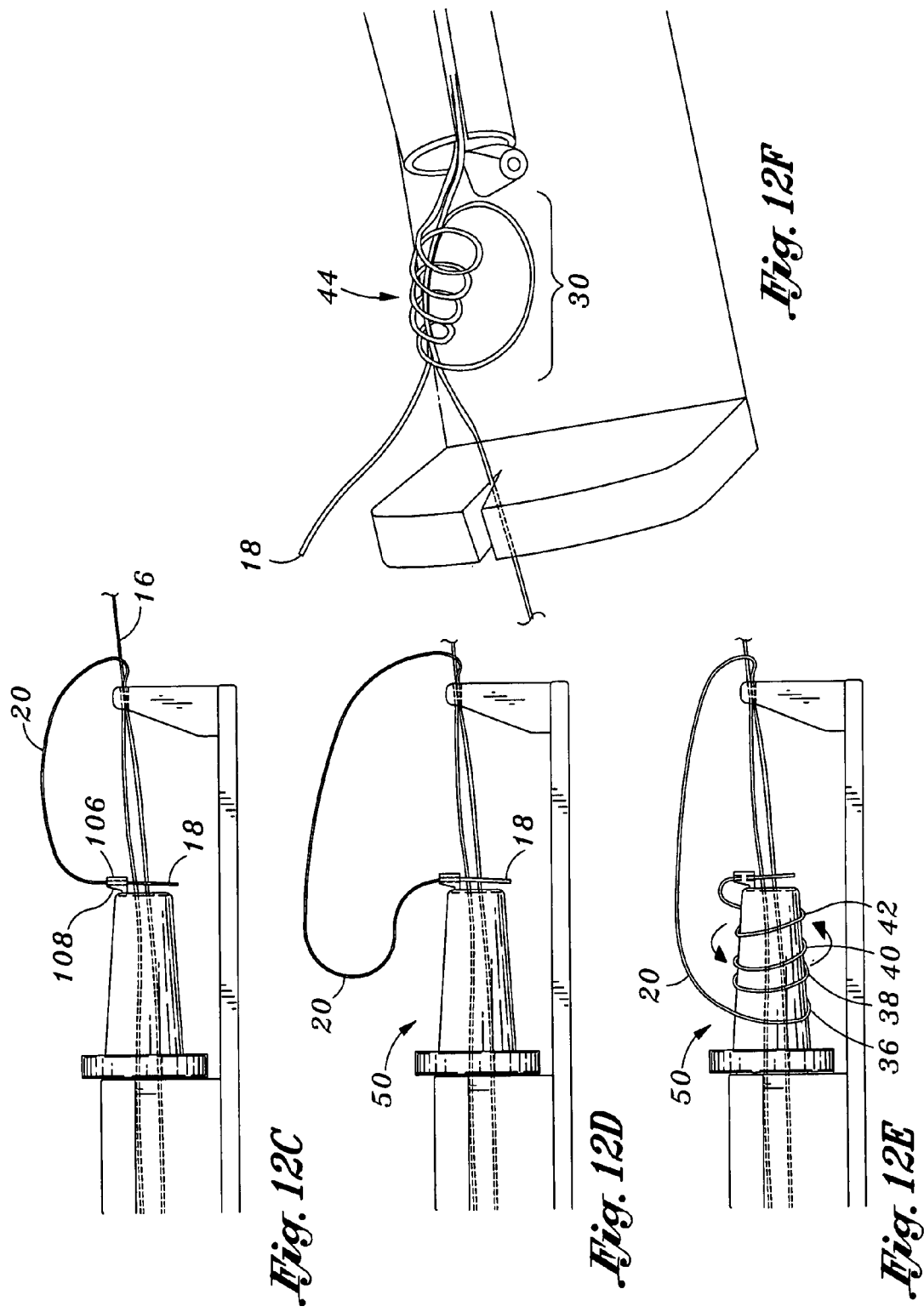

UNI-KNOT TYING APPARATUS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates generally to assistive knot tying devices, and more particularly, the invention relates to hand-held, portable devices for tying fishing knots.

2. Related Art

Fishing is an activity that has been pursued by humans for at least 10,000 years, primarily for food, and oftentimes for recreation. A wide variety of practices fall under the general category of fishing, including angling, spear-fishing, blast fishing, and so forth. The most popular type of recreational fishing is angling, in which a hook (also referred to as "angle") or other like tackle is attached to a rod by a line. The rod also typically includes a reel that stores, retrieves, and pays out the line. The hook is often dressed with bait to persuade the fish to bite down upon the same, resulting in the capture of the fish.

A typical fishing sequence would begin with the hooking of the bait. At this point, the end of the fishing line not attached to the reel has significant weight, including the weight of the bait, as well as any sinkers attached thereto. The hook, bait, and sinker are then "cast out" to the water. Depending on the desired pace, the angler may slowly reel in the bait so as to simulate a naturally swimming organism, or simply wait until a fish bites. When this occurs, the fish is "hooked" by a sudden and forceful pull on the line through the rod, fully driving the hook into the fish. Although specific techniques may vary, the fish is "reeled in" and the angler removes the hook. The aforementioned sequence is then re-initiated to catch another fish.

As will be appreciated by a practitioner having ordinary skill in the fishing arts, proper selection and use of knots to attach the hook to the line is essential to success because it is the weakest part of the hook-line-rod-reel assembly. A wide variety of knots are in use, such as the Snell knot, the Jansik knot, the Palomar knot, and the Trilene knot, among numerous others. The sheer number of possible knots is illustrative of the fact that each knot has its advantages and disadvantages, for if there was only one universal knot, then such knot would be used in all occasions.

The predominant consideration in knot selection is whether the knot will decrease the breaking strain of the line. Such a decrease in the breaking strain is undesirable because the hook may detach from the line after a sudden or severe jolt in the same, a frequent occurrence during fishing. When casting out, a significant centrifugal force is imparted upon the hook, bait, and sinker, tending to break the knot between the hook and the line. Further, when reeling in, the fish may resist, again stressing the knot between the hook and the line.

It has been found that the uni-knot provides a great amount of knot strength, and is therefore one of the most common knots used by anglers. A uni-knot maintains approximately ninety percent of its breaking strain. It is understood that the breaking strain of a line diminishes when there is a great deal of bending and twisting of the line, and when a uni-knot is tied, the main portion of the line is not bent at all, preventing the introduction of kinks therein and preserving its breaking strain. Another advantage of the uni-knot is that is can be used by both freshwater and saltwater anglers.

Referring to FIG. 1, a typical angling configuration includes a reel 10 attached to an elongate rod 12 having a distal end 12a and a proximal end 12b. The reel 10 is operative for spooling a line 14. In this regard, that section of the line 14 which attaches to the reel 10 is referred to herein as the main line 16, while the free end of the line 14 unattached to the reel 10 is referred to herein as the tag end 18.

With reference now to FIG. 2a-2f, the steps necessary to manually tie a uni-knot will be described. As shown in FIG. 2a, the line 14 is threaded through an eye 26 of a hook 24. Henceforth, the section of the line 14 between the eye 26 and the tag end 18 will be referred to as tag 20. In the cause of further differentiating the main line 16 from the tag 20, the section of the line 14 extending to the eye 26 from the reel 10 will be referred to as the main line 16. Still referring to FIG. 2a, the hook 24 is suspended on a first loop 28, with the tag 20 in an overlapping relationship with the main line 16. Next, with reference to FIG. 2b, the main line 16 is encircled with the tag 20 to form a second loop 30, with a first tag segment 32 of the tag 20 overlapping a second segment 34 of the same and the main line 16. Referring to FIG. 2c, the tag 20 forms a third loop 36 within the second loop 30, encircling the main line 16 and the second tag segment 34. Additional loops are formed as shown in FIG. 2d, including fourth loop 38, fifth loop 40, and sixth loop 42, each within the second loop 30. As was the case for third loop 36, main line 16 and the second tag segment 34 are encircled by each of the fourth loop 38, the fifth loop 40, and the sixth loop 42. Then, as shown in FIG. 2e, the knot 44 is partially closed by pulling tag 20. The knot 44 is slid down to the eye 26, and tightened by pulling the main line 16. The tag 20 is trimmed, resulting in a completed uni-knot as shown in FIG. 2f.

Alas, given the above description of manually tying a uni-knot, it will be widely appreciated that tying a uni-knot is a challenging undertaking, particularly for those having reduced dexterity resulting from rheumatoid arthritis or other like diseases or for those having sustained significant hand injuries. In addition, an angler on a boat in the middle of the ocean or a lake may be subjected to cold, dark, and unsteady conditions while attempting to tie the knot. Furthermore, fishing line has a tendency to remain straight, thereby making any twists and turns more difficult to make. Quite simply, tying the uni-knot manually is seriously deficient in numerous respects. As tying fishing line to tackle is an essential aspect of fishing, an inability to do so precludes many yearning anglers from participating in the same.

Therefore, a device capable of tying a uni-knot for use in attaching a fishing hook to a fishing line would be desirable.

BRIEF SUMMARY

In accordance with one aspect of the present invention, a knot tying device for attaching a line to a hook with an eye is disclosed. The device may include a stator, a hollow cylindrical rotor rotatably mounted on the stator, and a rotating drive operatively coupled to the rotor. The rotor may have a proximal end and a distal end, and may also include a longitudinal slot extending from such proximal end to the distal end.

In accordance with another aspect of the invention, the device may include a line locking member disposed on the proximal end of the rotor, and may form a unitary structure with the same. The line locking member may further include an opening extending therethrough. Additionally, there may be included a support plate which secures the stator, the rotor, and the rotating drive. The support plate may be defined by a tackle securing end and a line securing end. In a further embodiment of the present invention, there may be a tackle securing member disposed on the tackle securing end of the support plate. The tackle securing member may additionally define a slot, as well as a concave surface for cooperatively engaging the hook. There may be a line securing member disposed on the line securing end of the support plate. In another embodiment, the line securing member may be configured to pinch the line. There may also be provided a line centering member disposed on the support plate. In one embodiment, this line centering member may be a hook.

In accordance with yet another aspect of the present invention, the rotating drive may be an electrical motor activated by a switch. According to one embodiment, the rotating drive may be operable to enable the rotor to make one complete rotation upon activation of the switch. Alternatively, the switch may be operable to enable the rotor to rotate proportionally to the length of time the switch is activated. In another embodiment, the rotating drive may be a connected to a manually operated crank.

In accordance with still another aspect of the present invention, a method for tying a knot to attach a line to tackle having an eye is disclosed. The method may include the step of threading the line through the eye of the tackle, in which the line may be defined by a main line portion, a tag portion, and a loose tag end. The method may also include the step of securing the tackle to a tackle securing member. Further, there may be a step of inserting the line into a hollow cylindrical rotor through a slit defined by the same. Another step may be attaching the tag portion and the main line portion of the line to a line securing member. This step may be followed by a step of holding the tag end of the line with a line locking member. Finally, this method may also include looping the tag portion of the line around the rotor.

According to another embodiment, the method may include the step of releasing the tag end of the line from the line locking member. Additionally, the method may include pulling the main line portion of the line to tighten a formed knot and removing the line from the rotor. The looping step may also include rotating the rotor, which may also include activating a switch which initiates that step.

Thus, a device which is capable of tying a uni-knot which minimizes the difficult manual manipulation of fishing line is disclosed. The numerous advantages will become apparent with reference to the following detailed description read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is a perspective view of a conventional fishing outfit with a rod, a reel, and a line.

FIGS. 2a-2f illustrate the sequence of manual tying of a uni-knot;

FIG. 3 is a perspective view of a first embodiment of a knot-tying device according to an aspect of the present invention;

FIG. 4 is a perspective view of a rotor utilized in the knot tying device;

FIG. 5 is a perspective view of a stator in the knot tying device;

FIG. 6a is a perspective view of a first embodiment of the tackle securing member of the knot tying device;

FIG. 6b is a side view of the first embodiment of the tackle securing member;

FIG. 6c is a front view of the first embodiment of the tackle securing member;

FIG. 7 is a perspective view of a second embodiment of the tackle securing member;

FIG. 8 is a front view of a line centering member of the knot tying device;

FIG. 9 is a front view of a line securing member of the knot tying device;

FIG. 10 is a side view of a first embodiment of a knot-tying device, specifically showing the rotating means that are an aspect of the present invention;

FIG. 11a is a top view of a second embodiment of a knot tying device, particularly focusing on the rotating means;

FIG. 11b is a side view of the second embodiment of the knot tying device;

FIG. 12a is a side view of a first embodiment of the knot tying device in comparison with a length of line threaded through an eye of a hook;

FIG. 12b is a side view of a first embodiment of the knot tying device with the hook secured to tackle securing member, a line threaded through a hollow portion of a rotor, and additionally attached to a line securing member;

FIG. 12c is a side view of a first embodiment of the knot tying device with a tag end of the line inserted into a line locking member;

FIG. 12d is a side view of a first embodiment of the knot tying device with a tag in preparation for looping around a line looping section of a rotor;

FIG. 12e is a side view of a first embodiment of the knot tying device with the tag looped around the line looping section of the rotor; and FIG. 12f is an exemplary uni-knot prior to tightening, with the main line and the tag threaded through the hollow portion of the rotor.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

With reference now to FIG. 3, a first embodiment of the knot tying device 46 of the present invention is illustrated, including stator 48 and a rotor 50 rotatably mounted thereon.

Additionally, there is a rotating drive 52 operatively coupled to the rotor 50, the details of which are discussed more fully below. The knot tying device 46 also includes a tackle securing member 54, a line securing member 56, and a line centering member 58, all of which are mounted on a top surface 62 of a support plate 60 and discussed in further detail hereunder.

In further detail, support plate 60 is planar and generally elongated with a tackle securing end 68 and a line securing end 70. In addition to being defined by the top surface 62, the support plate 60 is defined by a bottom surface 64 and a peripheral edge 66. According to one embodiment, the tackle securing end 68 may be rounded, that is, having no hard edges so as to prevent injury to the user or damage to surroundings when it is dropped on or otherwise abruptly forced upon the same. It is anticipated that such drops will be a frequent occurrence during angling activities due to the inherently unsteady environment in which the angler is placed in, such as boats and unstable ground which surrounds bodies of water. However, it will be appreciated by one having ordinary skill in the art that the shape of the support plate 60 need not be limited to the particulars described herein, and any suitable configuration capable of serving as an attachment point for the aforementioned components may be substituted.

With regard to the rotor 50, further details will now be discussed with reference to FIG. 4. The rotor 50 is generally defined by a hollow cylindrical shaft 72 extending from a tackle end 74 to a knot formation end 76. The shaft 72 is defined by an outer shaft surface 78, and a hollow shaft portion 79 having an inner shaft surface 80 extending from the tackle end 74 to the knot formation end 76, and is segregated by a first wheel 88 and a second wheel 90 into a tackle end section 82, a stator attachment section 84, and a line looping section 86. While reference has been made to sections, of the shaft 72 and wheels segregating the same, it will be understood that in a preferred embodiment rotor 50 and the various components thereof are of unitary construction. This does not preclude, however, configurations in which the first and second wheels 88 and 90 are separate from and merely attached to the shaft 72.

Still referring to FIG. 4 and now additionally to FIG. 5, the stator attachment section 84 is seated within the stator 48, and is configured to rotate within. The stator 48 is generally defined by a bottom surface 92 which is attached to top surface 62 of the support plate 60, two side surfaces 94 and 96, a front surface 98, a back surface 100, and a top surface 101. Further, there is a gap 102 on the top surface 101 for reasons discussed in further detail below. The gap 102 is a part of a rotor seating opening 104, and conforms to the cylindrical shape of the stator attachment section 84 on the rotor 50. This permits the rotor 50 to rotate within the stator 48. Moreover, the first wheel 88 is in an abutting relationship with the front surface 98 of the stator 48, and the second wheel 90 is in an abutting relationship with the back surface 100 of the stator 48, essentially defining a sandwiched relationship between the first and second wheels 88 and 90, respectively, and the rotor 50. In this regard, when the rotor 50 is rotated, the first and second wheels 88 and 90 prevent the same from sliding out of the rotor seating opening 104. It will be appreciated by one having ordinary skill in the art that any configuration in which the rotor 50 is capable of rotating within the stator 48 is deemed to be within the scope of the present invention.

With further regard to the features of rotor 50, the line looping section 86 thereof is conical in shape and tapers to the knot formation end 76. This configuration permits a smoother withdrawal of line spooled onto the line looping section 86, further details in relation to the use of the knot tying device 46 of which will be discussed hereunder.

Another feature of rotor 50 is a line insertion slit 110 which extends along the entire length of the rotor 50 and provides and opening into the hollow shaft portion 79. As shown in the FIG. 4, the line insertion slit 110 extends parallel to the longitudinal axis 51 of the rotor 50. The first wheel 88 and the second wheel 90 also define a part of the line insertion slit 110. It is understood that the width of the line insertion slit 110 may be varied, but in general it is configured to permit a single or a double strand of line to be removed from or inserted to the hollow shaft portion 79 without encountering resistance that may fray the line. However, in a typical configuration, the line insertion slit 110 will be no wider than that of the gap 102 on the stator. The line insertion slit 110 as relating to the uni-knot tying procedure will be considered in further detail below.

At the knot formation end 76 there is a line locking member 106 that extends beyond the knot formation end 76, and includes a portion oriented perpendicularly to the longitudinal axis 51 of the rotor 50. The line locking member 106 includes an opening 108 which extends through the entirety of the same, and is of sufficient size to permit the passage of a single strand of line. The details of the use the line locking member 106 will be discussed below.

Referring back to FIG. 3, as briefly mentioned above the tackle securing end 68 of the support plate 60 includes a first tackle securing member 54. FIGS. 6a, 6b, and 6c illustrates an exemplary first tackle securing member 54 in accordance with an aspect of the present invention, and includes an attachment member 112 having a planar surface extending parallel to the support plate 60. In the particular embodiment shown in the figures, the attachment member 112 includes threading 114, the support plate 60 defines an opening, and a correspondingly threaded screw 116. The screw 116 is inserted through the opening, and threaded through the attachment member 112. The frictional force imparted by a screw head 118 against the bottom surface 64 of the support plate 60 maintains the positioning of the first tackle securing member 54. Alternatively, the attachment member 112 may be welded or otherwise attached to the support plate 60 using well known techniques.

The first tackle securing member 54 includes an upright portion 120 which extends substantially perpendicularly to the planar surface of the attachment member 112. It will be appreciated by one having ordinary skill in the art, however, that the upright portion 120 may be oriented in any suitable direction which is capable of supporting a tackle and a line. Conventional fishing tackle such as hook 24 typically includes a shank portion 25, and an eye 26. The eye 26 is generally formed by looping the shank portion, and so an outer edge 27 of the hook 24 is arcuate. The upright portion 120 includes a concave section 122 to accommodate the arcuate outer edge 27 of the hook 24, thus increasing the contact surface area thereof for improved holding characteristics. Additionally, the upright portion 120 includes a line slit 124 which is sized to permit the traversal of the line 14 through the same, while holding the eye 26 of the hook 24 against the upright portion 120.

Additional embodiments relating to the tackle securing member have been contemplated as shown in FIG. 7. The second tackle securing member 149 includes an upper plate 150 and a lower plate 152 attached to the top surface 62 of the support plate 60. The upper plate 150 is coupled to the lower plate 152 by a screw 153 extending therethrough and imparting a compression force to the upper plate 150 by tightening a wingnut 156 threaded thereon. The upper and lower plates 150 and 152, respectively, include a hollow half-tube 154 extending through both, forming a space in which the hook 24 may be inserted and held in place. The foregoing is by way of example only and not of limitation, and any suitable clamping mechanism which compressively retains the hook 24 may be readily substituted.

Disposed on the support plate 60 between the tackle end 74 of the rotor 50 and the tackle securing member 54 is a line centering member 58, the details of which are depicted in FIG. 8. In its most basic form, the line centering member 58 is a J-shaped hook having a main shaft portion 126 and a bend portion 128. The bend portion 128 is further defined by an outer bend 130 and an inner bend 132. In conjunction with the tackle securing member 54, the line centering member 58 serves to align the line 14 along the longitudinal axis 51 of the rotor 50. Effectively, the lower closed end of the line slit 124 on the tackle securing member 54 serves as the lower limit of any angular deviation in the line 14, while the upper closed end of the inner bend 132 on the line centering member 58 serves as the upper limit of any angular deviation in the line 14. It is understood that any similar structure having this particular feature may be readily substituted, such as a structure defining an eye with a side slit through which the line 14 may be inserted within.

On the support plate 60, opposite to the tackle securing end 68 is the line securing end 70, which includes the line securing member 56. As shown in FIG. 9, at the center of the line securing member 56 is a tapering slit 59 extending from the top surface thereof. The line securing member 58 is constructed of rubber or other like elastic material. The slit 59 tapers to a point, and a line inserted through to that point will be held in place by the elastic forces imparted by the surrounding material. It will be understood that the upper portions of the slit 59 are wider to guide the line which is being inserted. It will further be understood that the position of the taper point on the line securing member 58 is generally coaxial with the longitudinal axis 51 of the rotor 50 so that the line likewise remains coaxial therewith. The aforementioned description of the line securing member 58 is in no way understood to be limiting, and other structures capable of imparting a pinching force upon a line to secure the same is deemed to be within the scope of the present invention.

Referring back now to FIG. 3, and additionally to FIG. 10, the mechanism by which the rotor 50 rotates according to a first embodiment will now be discussed. Attached to the bottom surface 64 of the support plate 60 via a handle attachment member 136 is a handle 134. Within the handle 134 is an electric motor 138, with a motor shaft 140 extending therefrom capable of transmitting the rotational motion of the electric motor 138, typically powered by conventional batteries well known in the art. In this regard, the electric motor 138 may be activated by a switch 139 on the exterior surface of the handle 134. According to an embodiment of the present invention, the switch may be operative to initiate one complete rotation of the rotor 50, with the line insertion slit 110 being initially and finally aligned with the gap 102 of the stator 48. According to another embodiment of the present invention, the switch 139 may be operative to proportionally rotate the rotor 50 depending on the length of time the switch 139 is being activated. For instance, short presses on the switch 139 will rotate the rotor 50 in short bursts, while continuously depressing the switch 139 will continuously rotate the rotor 50. It will be appreciated by one having ordinary skill in the art that any type of switch may be utilized, and any rotational sequences may be utilized without departing from the invention.

Next, attached to the end of the rotor shaft 140 is a main drive wheel 142. The outer surface of the main drive wheel 142 includes traction grooves 144, which cooperatively engages the surface of an intermediary coupling wheel 146. The coupling wheel 146 is attached to the handle attachment member 136 via a cylindrical coupling shaft 148, allowing the coupling wheel 146 to rotate about the same. It is understood that the main drive wheel 142 is constructed of metallic material, while the coupling wheel 146 is constructed of rubber, foam, or other rigidly elastic material. By being in a pressed relation against the main drive wheel 142, the coupling wheel 146 catches the traction grooves 144. Thus, by rotating the main drive wheel 142, the rotational motion is transferred to the coupling wheel 146. Finally, the rotational motion is transferred to the rotor 50 via first wheel 88, which like the main drive wheel 142, includes traction grooves 89 that the coupling wheel 146 catches. The support plate 60 includes a coupling wheel opening 63 which allows the operative coupling of the rotation generation means disposed below the support plate 60 and the rotor 50, which is disposed above the support plate 60. Collectively, this drive mechanism will be referred to hereinafter as the parallel drive shaft mechanism.

With reference now to FIGS. 11a and 11b, the rotation mechanism according to a second embodiment of the present invention will be considered. Unlike the first embodiment in which the longitudinal axis 51 of the rotor 50, the longitudinal axis of the coupling shaft 148, and the longitudinal axis of the motor shaft 140 all extended in a parallel relationship to each other, the longitudinal axis 51 of the rotor 50 extends perpendicularly to the longitudinal axis of the motor shaft 140. Attached to the motor shaft 140 is a larger main drive wheel 158, and is oriented perpendicularly to the first wheel 88. By rotating the main drive wheel, the instantaneous linear motion associated with the same imparts a similarly instantaneous linear motion upon the first wheel 88, thereby rotating the rotor 50. The main drive wheel 158 includes a flexible layer 160 which is pressed against the metallic first wheel 88, including the aforementioned traction grooves 89. It will be appreciated that the rotor 50 is identical to the one set forth in the first embodiment in all respects, and the only difference between the first embodiment as described immediately above and the second embodiment is in the way the main drive wheel 158 is oriented. In order to accommodate the different orientation, the motor shaft 140, and thus the handle 134 and the main drive wheel 158, are disposed on the top surface 62 of the support plate 60. It is understood that an increased stand off height of the stator 48 is required to prevent the perimeter of the main drive wheel 158 from contacting the top surface 62 of the support plate 60. A second handle support member 162 elevates and holds the handle 134 at the required height. Hereinafter the drive mechanism described above will be referred to as the perpendicular drive shaft mechanism.

With regard to both the first and second embodiments as discussed above, it will be understood by a person of ordinary skill that differing drive mechanisms may be utilized. For example, instead of utilizing a frictional drive system, a gear system may be used, in which the respective wheels include intermeshing teeth. With particular regard to the second embodiment, bevel gears having a 45 degree bevel may be utilized. Further, a belt drive system may also be used, in which the respective wheels are coupled via belts. These particulars are presented by way of example only and not of limitation, and any well-known drive mechanism may be readily substituted without departing from the scope of the invention. It will also be understood that the electric motor 138 present in both of the embodiments are presented by way of example only, and any suitable rotating motive force may be utilized instead. Such rotating motive force may be provided manually via a crank, or the rotor 50 may be manually rotated.

Now, the sequence of steps for tying a uni-knot with the knot tying device 46 will be discussed with reference to FIGS. 12a-12e, and with due regard to the nomenclature applied to the essential features of a uni-knot as described in the background. Although the examples are described in relation to the first embodiment of the invention, particularly the knot tying device 46 having the first tackle securing member 54 and the parallel drive shaft mechanism, the essential operating features remain the same across the various embodiments. The way one embodiment is operated is readily transferable to another embodiment.

Referring to FIG. 12a, the line 14 is threaded through the eye 26 of the hook 24, with the tag 20 extending approximately double the distance between the tackle securing end 68 and the line securing end 70 of the support plate 60. This ensures a sufficient amount of tag 20 to for looping around the line looping section 86 of the rotor 50. Next, as illustrated in FIG. 12b, the outer edge 21 of the eye 26 is positioned in an abutting relationship with the concave section 122 of the tackle securing member 54, and inserting both the tag 20 and the main line 16 of the line 14 into the line slit 124. Upon securing the hook 24 to the tackle securing member 54, both the main line 16 and the tag 20 of the line 14 are inserted into the hollow shaft portion 79 of the rotor 50 via the line insertion slit 110, and are also positioned against the inner bend 132 of the line centering member 58. Doing so positions the main line 16 and the tag 20 at the axis 51 of the rotor 50, and reduces the possibility of the line 14 catching on an internal edge within the hollow shaft portion 79. After ensuring that the tag 20 and the main line 16 are centered within the rotor 50, the two sections of the line 14 are inserted into the line slit 124 of the line securing member 56. The aforementioned completed steps will yield a result similar to that as illustrated in FIG. 12b.

Referring now to FIGS. 12c and 12d, the tag end 18 is inserted into the opening 108 on the line locking member 106, with a small portion of the tag 20 protruding from the line locking member 106. The tag 20 is pulled toward the line looping section 86, and the rotor 50 is rotated via one of the numerous mechanisms discussed above. As shown in FIG. 12e, the sixth loop 42, the fifth loop 40, the fourth loop 38, and the third loop 36 are formed, in that order, by rotating the rotor 50. Effectively, the third, fourth, fifth, and sixth loops 36, 38, 40 and 42 are formed around both the tag 20 and the main line 16. In order to ensure proper removal of the tag 20 and the main line 16, the line insertion slit 110 is aligned with the gap 102 on the stator 48. More particularly, the rotor 50 is rotated so that the opening of line insertion slit 110 is exposed in the same direction as the gap 102.

As illustrated in FIG. 12f, the tag end 18 is removed from the line locking member 106 and held in place. Then the third loop 36, the fourth loop 38, the fifth loop 40, and the sixth loop 42 are removed from the line looping section 86 and over the line locking member 106. At this point, the uni-knot is essentially formed. The tag 20 is pulled to partially close the knot 44 as shown in FIG. 12f. Further, the main line 16 and the tag 20 are removed from the rotor 50 through line insertion slit 110, as well as from the line centering member 58 and the tackle securing member 54. The knot 44 is slid down so that it abuts the outer edge 27 of the hook 24. The knot 44 is further tightened by pulling the main line 16, with the completed knot illustrated in FIG. 2f.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show particulars of the present invention in more detail than is necessary for the fundamental understanding of the present invention, the description taken with the drawings making apparent to those skilled in the art how the several forms of the present invention may be embodied in practice.

What is claimed is:

1. A knot tying device for attaching a line to a hook having an eye, the device comprising:
   a stator;
   a hollow cylindrical rotor rotatably mounted on the stator, the rotor having a proximal end and a distal end and defining a longitudinal slot extending from the proximal end to the distal end;
   a rotating drive operatively coupled to the rotor;
   a support plate for securing the stator, the rotor, and the rotating drive, the support plate having a tackle securing end and a line securing end; and
   a hook disposed on the support plate.

2. The device of claim 1, further comprising a line locking member disposed on the proximal end of the rotor.

3. The device of claim 2 wherein the line locking member and the rotor form a unitary structure.

4. The device of claim 2 wherein the line locking member defines an opening extending therethrough.

5. The device of claim 1, further comprising a tackle securing member disposed on the tackle securing end of the support plate.

6. The device of claim 5 wherein the tackle securing member defines a slot.

7. The device of claim 5 wherein the tackle securing member includes a concave surface for cooperatively engaging the hook.

8. The device of claim 1, further comprising a line securing member disposed on the line securing end of the support plate.

9. The device of claim 8, wherein the line securing member is configured to pinch the line.

10. The device of claim 1 wherein the rotating drive is an electrical motor activated by a switch.

11. The device of claim 10 wherein the switch is operable to enable the rotor to make one complete rotation upon activation of the switch.

12. The device of claim 10 wherein the rotating drive is operable to enable the rotor to rotate proportionally to the length of time the switch is activated.

13. The device of claim 1 wherein the rotating drive is a connected to a manually operated crank.

14. A method for tying a knot to attach a line to tackle having an eye, the method comprising the steps of:
   threading the line through the eye of the tackle, the line being defined by a main line portion, a tag portion, and an loose tag end;
   securing the tackle to a tackle securing member;
   inserting the line into a hollow cylindrical rotor through a slit defined thereby;

attaching the tag portion and the main line portion of the line to a line securing member;

holding the tag end of the line with a line locking member; and looping the tag portion of the line around the rotor.

15. The method of claim 14, further comprising the step of:

releasing the tag end of the line from the line locking member.

16. The method of claim 15, further comprising the steps of:

pulling the main line portion of the line to tighten a formed knot; and removing the line from the rotor.

17. The method of claim 15, wherein the looping step includes rotating the rotor.

18. The method of claim 17, wherein the step of rotating the rotor includes activating a switch which initiates the rotating step.

* * * * *